(12) United States Patent
Gan et al.

(10) Patent No.: US 10,310,057 B2
(45) Date of Patent: Jun. 4, 2019

(54) DISTANCE METER TELESCOPE

(71) Applicants: ShengHua Gan, Zhejiang (CN); LiangYin Kuo, Zhejiang (CN)

(72) Inventors: ShengHua Gan, Zhejiang (CN); LiangYin Kuo, Zhejiang (CN)

( * ) Notice: Subject to any disclaimer, the term of this patent is extended or adjusted under 35 U.S.C. 154(b) by 342 days.

(21) Appl. No.: 15/394,762

(22) Filed: Dec. 29, 2016

(65) Prior Publication Data

US 2018/0188354 A1    Jul. 5, 2018

(51) Int. Cl.
| | | |
|---|---|---|
| *G01C 3/08* | (2006.01) |
| *G01S 7/481* | (2006.01) |
| *G02B 27/14* | (2006.01) |
| *G01S 17/08* | (2006.01) |
| *G02B 5/04* | (2006.01) |
| *G02B 23/10* | (2006.01) |
| *G02B 27/12* | (2006.01) |
| *G01S 17/88* | (2006.01) |
| *G02B 25/00* | (2006.01) |
| *G02B 27/10* | (2006.01) |

(52) U.S. Cl.
CPC ............. *G01S 7/4811* (2013.01); *G01S 17/08* (2013.01); *G01S 17/88* (2013.01); *G02B 5/04* (2013.01); *G02B 23/10* (2013.01); *G02B 27/126* (2013.01); *G02B 27/148* (2013.01); *G02B 25/001* (2013.01); *G02B 27/1006* (2013.01)

(58) Field of Classification Search
CPC ........ G01S 7/4811; G01S 17/08; G01S 17/88; G02B 5/04; G02B 23/10; G02B 27/126; G02B 27/148; G02B 25/001; G02B 27/1006
See application file for complete search history.

(56) References Cited

U.S. PATENT DOCUMENTS

| | | | | |
|---|---|---|---|---|
| 5,973,864 A | * | 10/1999 | Lehmann | ................... G01J 3/42 359/834 |
| 2007/0171520 A1 | * | 7/2007 | Fante | ........................ G02B 5/04 359/431 |
| 2011/0026012 A1 | * | 2/2011 | Barth | ...................... F41G 7/004 356/51 |

* cited by examiner

*Primary Examiner* — Samantha K Abraham

(57) ABSTRACT

A distance meter telescope having a telescope lens, a laser receiver, a display unit, a laser emission module, a beam splitter assembly and an eyepiece; the laser receiver receives a laser beam emitted from the laser emission module; the beam splitter assembly has a roof prism, a prism separation board, a first semi-penta prism and a second semi-penta prism; the roof prism has a light input surface, a roof surface, and an output surface; the first semi-penta prism has a first entering and reflective surface for output light, a first input and output surface and a first gluing surface; the second semi-penta prism has a second entering and reflective surface for output light, a second input and output surface and a second gluing surface. The beam splitter assembly makes the light beam passing through the telescope lens, the laser light beam received by the laser receiver and the light beam from the display unit coaxial. Accordingly, product size can be reduced and the prisms can be shared.

6 Claims, 4 Drawing Sheets

DISTANCE METER TELESCOPE

BACKGROUND OF THE INVENTION

The present invention relates to a kind of distance meter, and more specifically relates to a distance meter telescope.

Distance meter is a kind of equipment that makes use of the reflection and interference of lights, sounds and electromagnetic waves to measure lengths and distances. On the basis of measuring lengths, some newly developed distance meters can also perform scientific calculations of different parameters such as surface areas, perimeters, sizes and masses of the target objects based on the measured lengths. Distances meters have a wide range of applications in various fields such as engineering, GIS investigations and military affairs.

Distance meter telescope is a branch of laser distance meter. Distance meter telescope may be called a long distance laser distance meter, which generally uses pulse ranging method to measure distance. Said pulse ranging method is that, laser emitted from a distance meter is reflected by the target object and again received by the distance meter, and the distance meter simultaneously records the laser travelling time to and from the target object. The distance between the distance meter and the target object is half of the product of the speed of laser times the total laser travelling time to and from the target object. Distance measurement by pulse ranging method has a general accuracy of around +/− one meter.

FIG. 1 shows a kind of known optical distance measurement device. Such optical distance measurement device has been disclosed in Chinese granted patent publication number CN100403090C. The optical distance measurement device 90 according to this patent comprises an optical emission system 92 and an observation/receiving optical system 91. The observation/receiving optical system 91 comprises a first lens 94, a light splitting and merging prisms group 20, a display module 95, a detector 99 and an eyepiece 97. The optical emission system 92 comprises a second lens 98 and an emission assembly 96. Light rays which are within the visible light spectrum representing an image of the target object emit towards the optical distance measurement device from the first lens 94; next, the visible light rays emit to the light splitting and merging prisms group 20 via a first light input/output surface 213. In the light splitting and merging prisms group 20, the light rays travel along a path of a first wavelength beam r1 and leave from the second light input/output surface 223; after that, the light rays pass through the eyepiece 97 so that an observer can clearly see the target object. The emission assembly 96 comprises a laser diode 961 and a lens group 962, and emits infrared light rays. The infrared light rays pass through the second lens 98 and travel to the target object. The target object reflects the infrared light rays. Some of the reflected infrared light rays emit to the observation/receiving optical system 91 through the first lens 94. In the observation/receiving optical system 91, the infrared light rays pass through the first light input/output surface 213 of a roof prism 21 and travel to the light splitting and merging prisms group 20; then the infrared light rays travel along a path of a second wavelength beam r2, and leave from a fourth input/output surface 232 of a compensation prism; lastly, the detector 99 receives the infrared light rays. Accordingly, the optical distance measuring device 90 calculates a distance between the optical distance measuring device and the target object based on the travelling time of the infrared light rays to and from the target object and the optical distance measuring device. The display module 95 such as an LCD component or LED digital display unit emits light rays of predefined narrow wavelengths to display the measured distance. The light rays of predefined wavelengths emitted by the display module 95 comes from the second input/output surface 231 of the compensation prism 23, and emit into the light splitting and merging prisms group 20. The light rays of narrow wavelengths travel along the path of the second wavelength beam r2, and leave from the second light input/output surface 223. Consequently, the light rays of narrow wavelengths travel through the eyepiece 97 so that the observer can clearly see the numbers displayed by the display module.

In short, the according the prior art, the compensation prism 23 of an optical distance measuring device is a pentaprism which has a complicated structure and a high manufacture cost. Also, due to structural issue, clear apertures of the infrared light rays and the light rays emitted from the display module 95 will be limited.

BRIEF SUMMARY OF THE INVENTION

In view of the aforesaid disadvantages now present in the prior art, the present invention provides a distance meter telescope.

To attain the object of the present invention, the present invention has the following technical solution:

A distance meter telescope, comprising a telescope lens, a laser receiver, a display unit, a laser emission module, a beam splitter assembly and an eyepiece; the laser receiver receives a laser beam emitted from the laser emission module; the beam splitter assembly comprises a roof prism, a prism separation board, and similarly shaped first semi-penta prism and second semi-penta prism; the roof prism has a light input surface, a roof surface, and an output surface; the first semi-penta prism has a first entering and reflective surface for output light, a first input and output surface and a first gluing surface; the second semi-penta prism has a second entering and reflective surface for output light, a second input and output surface and a second gluing surface; the first gluing surface of the first semi-penta prism and the second gluing surface of the second semi-penta prism are glued with each other; the first input and output surface and the second input and output surface are parallel to each other; the first entering and reflective surface for output light and the second entering and reflective surface for output light are parallel to each other; the first entering and reflective surface for output light and the output surface are parallel to each other; the prism separation board provided with a clear aperture is provided between the first entering and reflective surface for output light and the output surface of the roof prism;

a light beam received by the telescope lens travels through the telescope lens to the roof prism and then through the clear aperture on the prism separation board, and after that enters the first semi-penta prism and then subsequently to the eyepiece;

a laser light beam received by the telescope lens travels through the telescope lens and then enters the roof prism; after being reflected, the laser light beam leaves the roof prism and passes through the clear aperture on the prism separation board; after that, the laser light beam first enters the first entering and reflective surface for output light; since the first entering and reflective surface for output light is parallel to the second entering and reflective surface for output light, the laser light beam entered to the first entering and reflective surface for output light leaves from the second entering and reflective surface for output light and then focus on the laser receiver;

a light beam from the display unit perpendicular to the second input and output surface enters the second input and output surface, and then being reflected sequentially by the second entering and reflective surface for output light and the first entering and reflective surface for output light, and eventually leaves from the first input and output surface and directly enters to the eyepiece.

As a modification, the laser emission module mainly comprises a laser emitter and an emission lens assembly along the path of emission.

As a modification, the display unit is a light emitting LCD or a lighted OLED/LED display, positioned in front of the second input and output surface.

As a modification, semi-penta prisms in the beam splitter assembly are each formed with an angle of 45 degrees, and are mutually glued together to form the beam splitter assembly.

As a modification, the second entering and reflective surface for output light of the second semi-penta prism of the beam splitter assembly is plated with a reflective film layer for wavelength of the light from the display unit, and a penetrating film layer that facilitates input/output of laser.

Compared with the prior art, the present invention has the following beneficial effects:

The beam splitter assembly makes the light beam passing through the telescope lens, the laser light beam received by the laser receiver and the light beam from the display unit coaxial. Accordingly, product size can be reduced and the prisms can be shared. Also, the laser light beam and the light beam from the display unit use the entire second entering and reflective surface for output light and the second input and output surface respectively. As such, besides the coaxial effect of the two light beams, maximal use of the clear aperture can also be achieved.

DETAILED DESCRIPTION OF THE INVENTION

Figure 1:
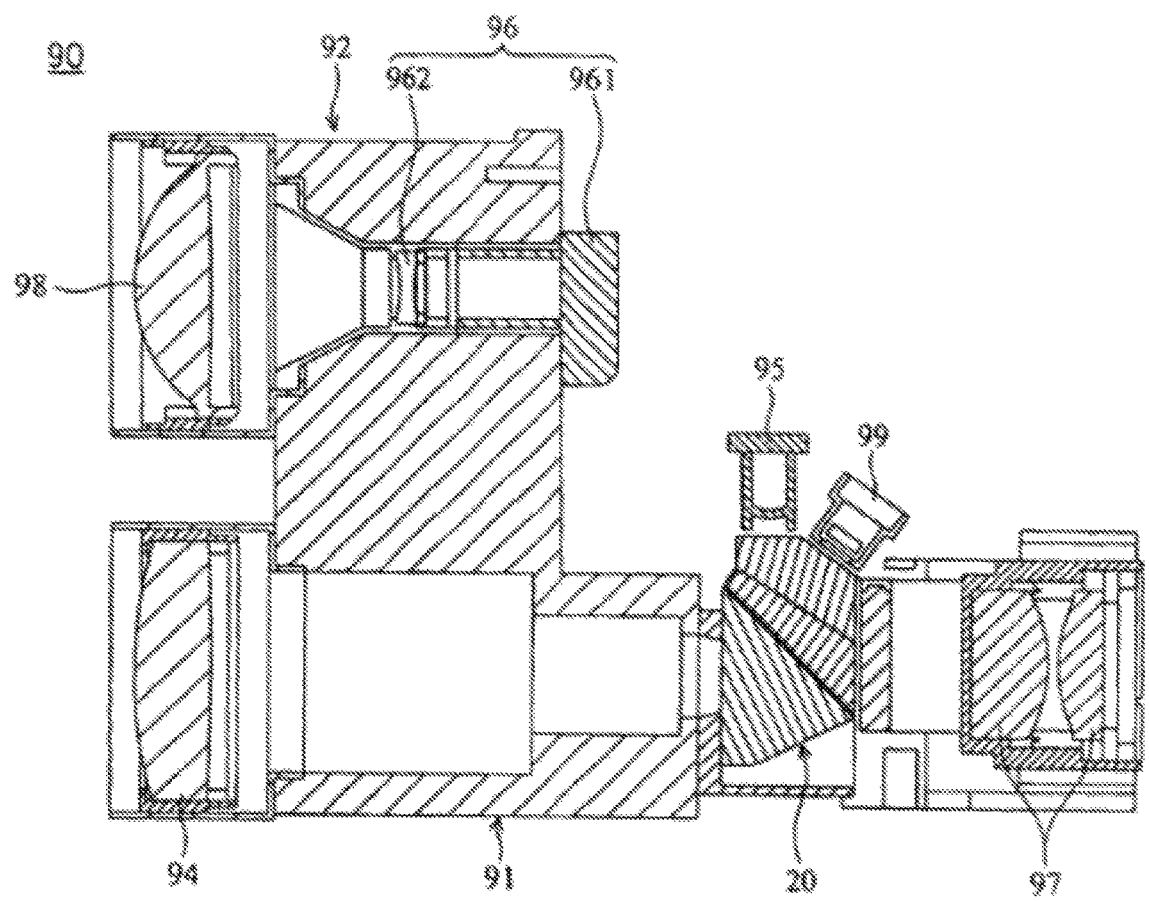
FIG. 1 is a structural view of the prior art.
Figure 2:
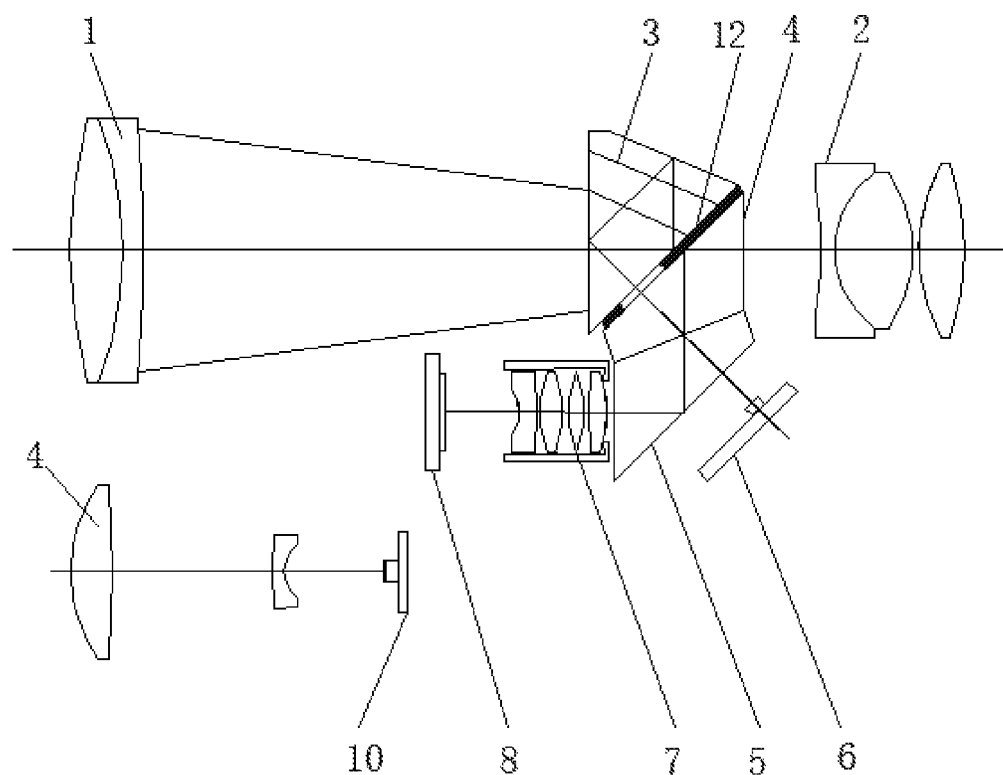
FIG. 2 is a structural view of the present invention.
Figure 3:
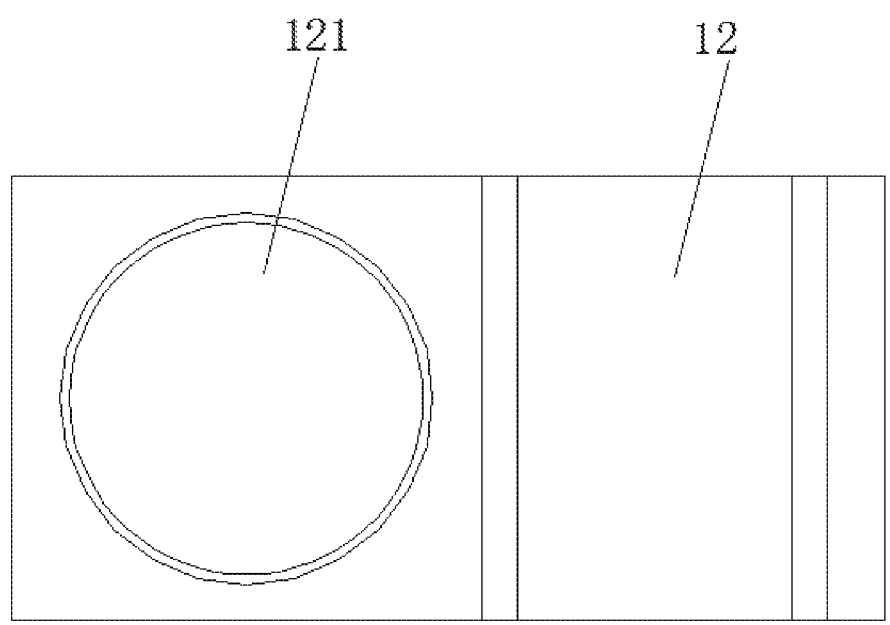
FIG. 3 shows the structure of the prism separation board.
Figure 4:
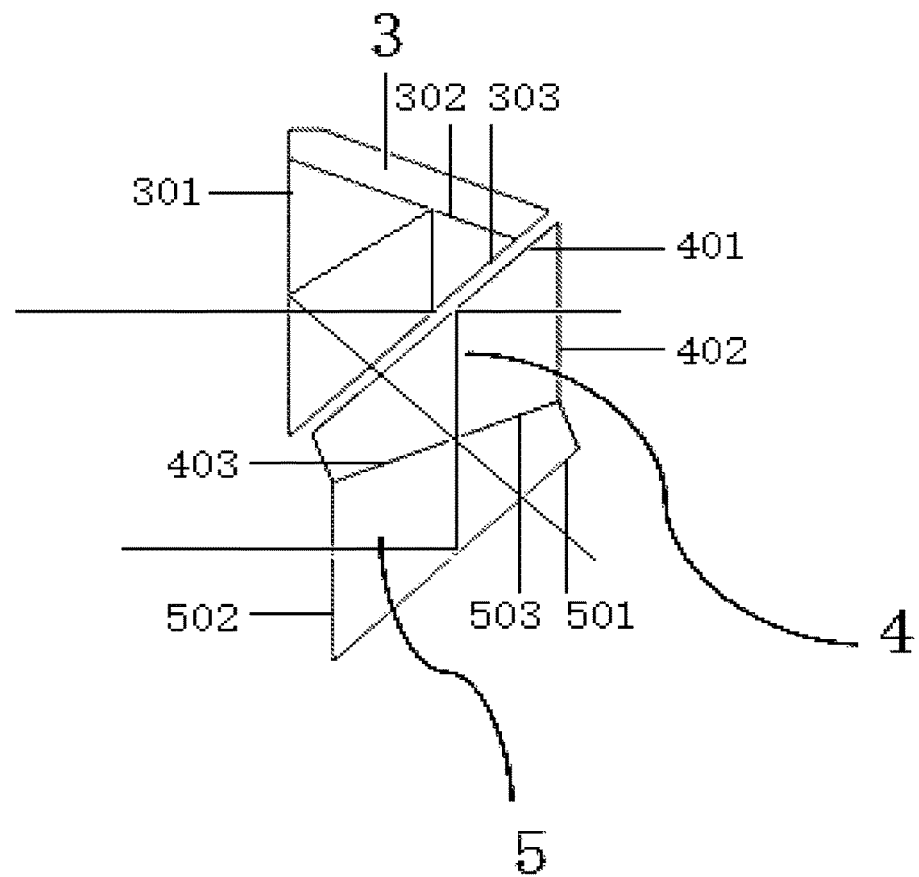
FIG. 4 is a structure view of the beam splitter assembly.

The technical solution provided by the invention according to an embodiment will be clearly and completely described below with reference to the drawings. Obviously, the embodiment as described below is only an example of implementing the present invention. Not all embodiments of the present invention will be described below. On the basis of the embodiment disclosed herein, any other embodiments conceivable by a person skilled in this field of art without any inventive laboring should also fall within the scope of protection of the present invention.

With reference to FIGS. 2-7, a distance meter telescope according to an embodiment of the present invention comprises a telescope lens 1, a laser receiver 6, a display unit 8, a laser emission module 10, a beam splitter assembly and an eyepiece 2; the beam splitter assembly makes a light beam passing through the telescope lens 1, a light beam received by the laser receiver 6 and a light beam from the display unit 8 coaxial; the laser receiver 6 receives a laser beam emitted from the laser emission module 10; the beam splitter assembly comprises a roof prism 3, a prism separation board, and similarly shaped first semi-penta prism 4 and second semi-penta prism 5; the roof prism 3 has a light input surface 301, a roof surface 302, and an output surface 303; the first semi-penta prism 4 has a first entering and reflective surface for output light 401, a first input and output surface 402 and a first gluing surface 403; the second semi-penta prism 5 has a second entering and reflective surface for output light 501, a second input and output surface 502 and a second gluing surface 503; the first gluing surface 403 of the first semi-penta prism 4 and the second gluing surface 503 of the second semi-penta prism 5 are glued with each other; the first input and output surface 402 and the second input and output surface 502 are parallel with each other; the first entering and reflective surface for output light 401 and the second entering and reflective surface for output light 501 are parallel with each other; the first entering and reflective surface for output light 401 and the output surface 303 are parallel with each other; the prism separation board 12 provided with a clear aperture 121 is provided between the first entering and reflective surface for output light 401 and the output surface of the roof prism.

Figure 5:
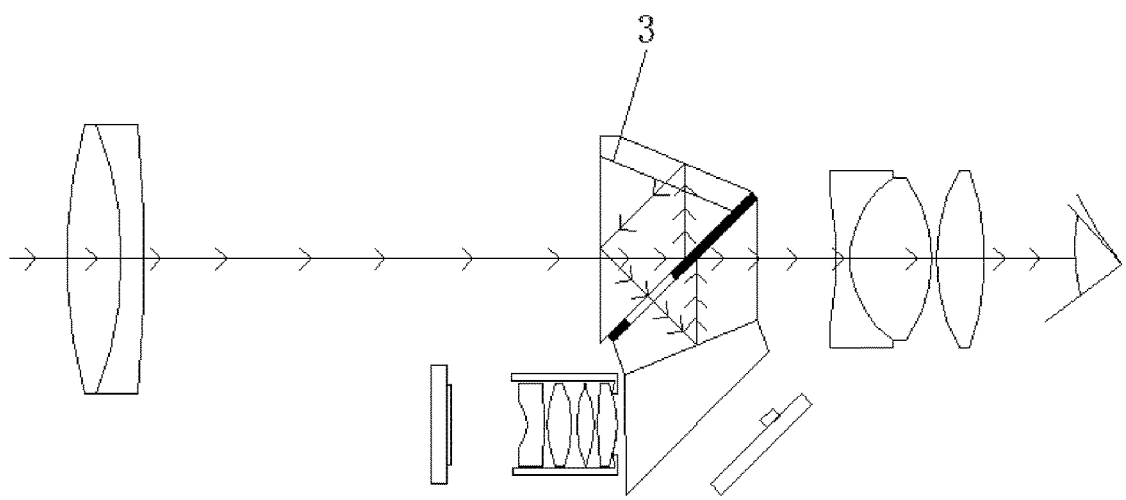
FIG. 5 shows a light beam passing through the telescope lens.

A light beam received by the telescope lens 1 travels through the telescope lens 1 to the roof prism 3 and then through the clear aperture 121 on the prism separation board 12, and after that enters the first semi-penta prism 4 and subsequently to the eyepiece (e.g. FIG. 5).

Figure 6:
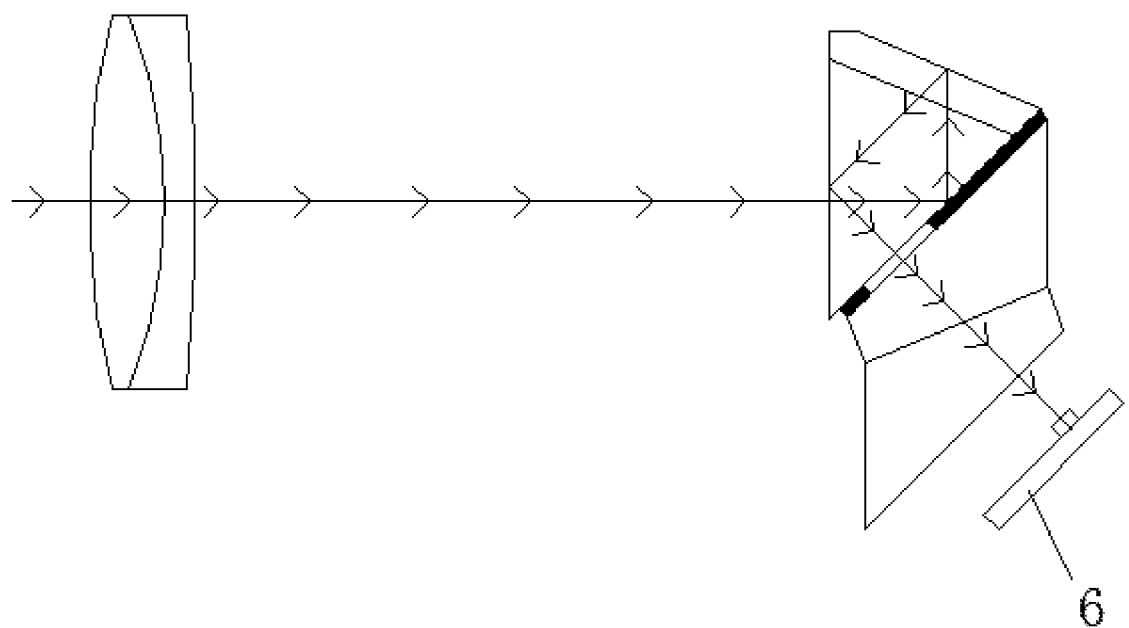
FIG. 6 shows a laser light beam received by the telescope lens.

A laser light beam received by the telescope lens 1 travels through the telescope lens 1 and then enters the roof prism 3; after being reflected, the laser light beam leaves the roof prism 3 and passes through the clear aperture 121 on the prism separation board 12; after that, the laser light beam first enters the first entering and reflective surface for output light 401; since the first entering and reflective surface for output light 401 is parallel to the second entering and reflective surface for output light 501, the laser light beam entered to the first entering and reflective surface for output light 401 will leave from the second entering and reflective surface for output light 501 and then focus on the laser receiver 6 (e.g. FIG. 6).

Figure 7:
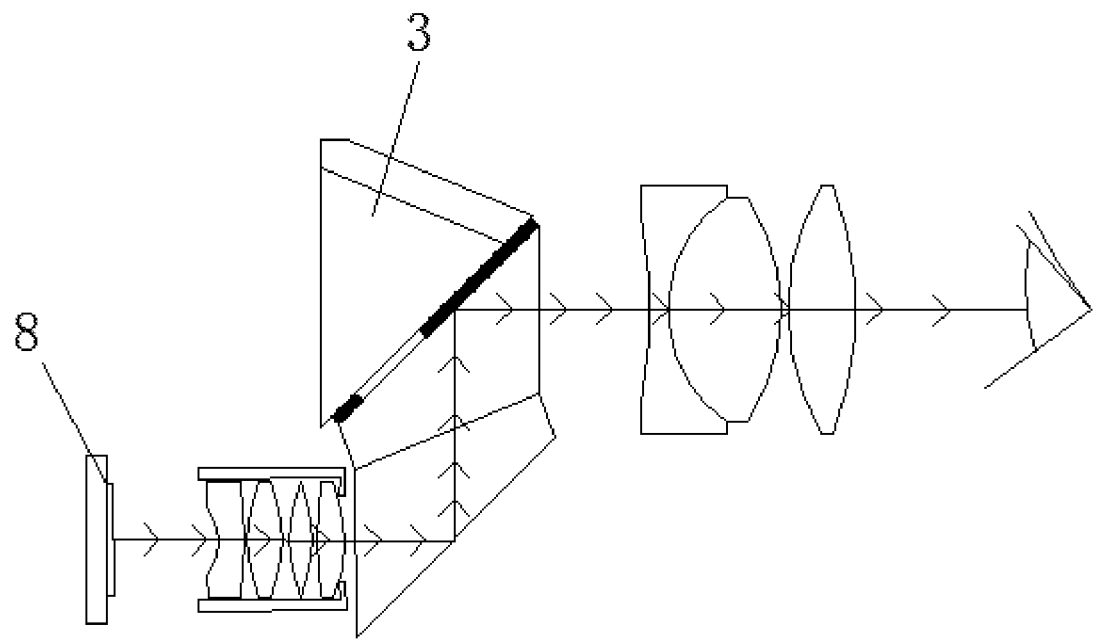
FIG. 7 shows a light beam from the display unit.

A light beam from the display unit 8 perpendicular to the second input and output surface 502 enters the second input and output surface 502, and then being reflected sequentially by the second entering and reflective surface for output light 501 and the first entering and reflective surface for output light 401, and eventually leaves from the first input and output surface 402 and directly enters to the eyepiece 2 (e.g. FIG. 7).

The laser emission module mainly comprises a laser emitter and an emission lens assembly along the path of emission.

The display unit 8 is a light emitting LCD or a lighted OLED/LED display, positioned in front of the second input and output surface 502.

Semi-penta prisms in the beam splitter assembly are each formed with an angle of 45 degrees, and are mutually glued together to form the beam splitter assembly.

The second entering and reflective surface for output light 501 of the second semi-penta prism of the beam splitter assembly is plated with a reflective film layer for wavelength of the light from the display unit, and a penetrating film layer that facilitates input/output of laser.

A person skilled in this field of art should notice that the present invention is not limited to the details illustrated by the embodiment. The present invention can be implemented by other embodiments without deviating from the essence or basic features of the present invention. Therefore, no matter from which aspect, the embodiment illustrated above is only illustrative and should not limit the present invention. The scope of the present invention is defined by the claims but not by the above description. Therefore, the present invention should include all variations of alternative features that fall within the scope and definition defined by the claims. The claims should not be limited by any reference numerals of the drawings contained in the claims.

What is claimed is:

1. A distance meter telescope, comprising a telescope lens, a laser receiver, a display unit, a laser emission module, a beam splitter assembly and an eyepiece; wherein the laser receiver receives a laser beam emitted from the laser emission module; the beam splitter assembly comprises a roof prism, a prism separation board, and similarly shaped first semi-penta prism and second semi-penta prism; the roof prism has a light input surface, a roof surface, and an output surface; the first semi-penta prism has a first entering and reflective surface for output light, a first input and output surface and a first gluing surface; the second semi-penta prism has a second entering and reflective surface for output light, a second input and output surface and a second gluing surface; the first gluing surface of the first semi-penta prism and the second gluing surface of the second semi-penta prism are glued with each other; the first input and output surface and the second input and output surface are parallel to each other; the first entering and reflective surface for output light and the second entering and reflective surface for output light are parallel to each other; the first entering and reflective surface for output light and the output surface are parallel to each other; the prism separation board provided with a clear aperture is provided between the first entering and reflective surface for output light and the output surface of the roof prism; a light beam received by the telescope lens travels through the telescope lens to the roof prism and then through the clear aperture on the prism separation board, and after that enters the first semi-penta prism and then subsequently to the eyepiece;

a laser light beam received by the telescope lens travels through the telescope lens and then enters the roof prism; after being reflected, the laser light beam leaves the roof prism and passes through the clear aperture on the prism separation board; after that, the laser light beam perpendicular to the first entering and reflective surface for output light first enters the first entering and reflective surface for output light; since the first entering and reflective surface for output light is parallel to the second entering and reflective surface for output light, the laser light beam entered to the first entering and reflective surface for output light leaves from the second entering and reflective surface for output light and then focus on the laser receiver;

a light beam from the display unit perpendicular to the second input and output surface enters the second input and output surface, and then being reflected sequentially by the second entering and reflective surface for output light and the first entering and reflective surface for output light, and eventually leaves from the first input and output surface and directly enters to the eyepiece.

2. The distance meter telescope according to claim 1, wherein the laser emission module mainly comprises a laser emitter and an emission lens assembly along a path of emission.

3. The distance meter telescope according to claim 1, wherein the display unit is a light emitting LCD or a lighted OLED/LED display, positioned in front of the second input and output surface.

4. The distance meter telescope according to claim 1, wherein semi-penta prisms in the beam splitter assembly are each formed with an angle of 45 degrees, and are mutually glued together to form the beam splitter assembly.

5. The distance meter telescope according to claim 1, wherein the second entering and reflective surface for output light of the second semi-penta prism of the beam splitter assembly is plated with a reflective film layer for wavelength of the light from the display unit, and a penetrating film layer that facilitates input/output of laser.

6. The distance meter telescope according to claim 1, wherein positions of the laser emission module and the laser receiver are interchangeable.

* * * * *